United States Patent
Turton

(10) Patent No.: US 9,671,229 B2
(45) Date of Patent: Jun. 6, 2017

(54) TELECOMMUNICATIONS NETWORK ROUTING

(75) Inventor: Brian Charles Hargrave Turton, Newport South Glanmorgan (GB)

(73) Assignee: Airbus Defence and Space Limited, Stevenage (GB)

( * ) Notice: Subject to any disclaimer, the term of this patent is extended or adjusted under 35 U.S.C. 154(b) by 433 days.

(21) Appl. No.: 13/876,761

(22) PCT Filed: Sep. 27, 2011

(86) PCT No.: PCT/GB2011/051828
§ 371 (c)(1),
(2), (4) Date: Apr. 30, 2013

(87) PCT Pub. No.: WO2012/042258
PCT Pub. Date: Apr. 5, 2012

(65) Prior Publication Data
US 2013/0218469 A1    Aug. 22, 2013

(30) Foreign Application Priority Data

Sep. 28, 2010 (GB) .................................. 1016306.1

(51) Int. Cl.
*G01C 21/00* (2006.01)
*H04W 40/00* (2009.01)
(Continued)

(52) U.S. Cl.
CPC ............. *G01C 21/00* (2013.01); *G01C 21/20* (2013.01); *G08G 1/096811* (2013.01);
(Continued)

(58) Field of Classification Search
None
See application file for complete search history.

(56) References Cited

U.S. PATENT DOCUMENTS 6,611,755 B1 * 8/2003 Coffee et al. ................. 701/482
8,374,781 B2 * 2/2013 Hartman ............ G01C 21/3469
701/123

(Continued)

FOREIGN PATENT DOCUMENTS

EP    0837567    4/1998
EP    2068592    6/2009

OTHER PUBLICATIONS

Ghanadan et al., "An Efficient Intranet Networking Solution for Airborne Networks", Jan. 2007, pp. 1-7, Publisher: BAE Systems Network Enabled Solutions.
(Continued)

*Primary Examiner* — Thomas G Black
*Assistant Examiner* — Demetra Smith-Stewart
(74) *Attorney, Agent, or Firm* — Sterne, Kessler, Goldstein & Fox P.L.L.C.

(57) ABSTRACT

An embodiment is directed towards a network controller for controlling a telecommunications network (70) comprising a plurality of vehicles (250, 280, 330) each including a telecommunications device. The network controller comprises a network configuration database (20), containing data representing the configuration of the network (70); an assets database (30), containing for each vehicle (250, 280, 330) (i) data representing planned movements of the vehicle (250, 280, 330) and (ii) data representing parameters for acceptable variation in said route (260, 290, 350); and an information exchange requirement (IER) database (40), containing data representing expected future network loading. An optimization engine (50) is configured to calculate a set of routes (260, 310, 350) for the vehicles (250, 280, 330) that optimizes the availability of the telecommunications network (70) in the geographic area.

17 Claims, 3 Drawing Sheets

(51) Int. Cl.

| | |
|---|---|
| *H04W 48/18* | (2009.01) |
| *H04L 12/801* | (2013.01) |
| *H04L 12/721* | (2013.01) |
| *G08G 1/0968* | (2006.01) |
| *G08G 5/00* | (2006.01) |
| *G01C 21/20* | (2006.01) |
| *G06F 9/50* | (2006.01) |

(52) U.S. Cl.
CPC ..... *G08G 1/096844* (2013.01); *G08G 5/0013* (2013.01); *G08G 5/0026* (2013.01); *G08G 5/0043* (2013.01); *G06F 9/5083* (2013.01); *H04L 45/12* (2013.01); *H04L 45/123* (2013.01); *H04W 48/18* (2013.01)

(56) References Cited

U.S. PATENT DOCUMENTS

| | | | | |
|---|---|---|---|---|
| 8,594,061 | B2* | 11/2013 | Kennedy | H04W 4/028 370/338 |
| 8,775,059 | B2* | 7/2014 | Heed et al. | 701/117 |
| 2003/0060973 | A1* | 3/2003 | Mathews et al. | 701/209 |
| 2004/0098447 | A1* | 5/2004 | Verbeke et al. | 709/201 |
| 2004/0156355 | A1* | 8/2004 | Stumpert | 370/352 |
| 2006/0089787 | A1* | 4/2006 | Burr et al. | 701/202 |
| 2007/0054674 | A1 | 3/2007 | Cohen et al. | |
| 2007/0078597 | A1 | 4/2007 | Kotzin | |
| 2010/0070128 | A1* | 3/2010 | Johnson | G08G 1/096783 701/31.4 |
| 2010/0080168 | A1 | 4/2010 | Fukuyama | |
| 2010/0332113 | A1* | 12/2010 | Tengler et al. | 701/123 |
| 2011/0310867 | A1* | 12/2011 | Kennedy | H04W 4/028 370/338 |
| 2012/0020216 | A1* | 1/2012 | Vashist | H04L 41/14 370/235 |
| 2012/0129517 | A1* | 5/2012 | Fox et al. | 455/425 |
| 2013/0285855 | A1* | 10/2013 | Dupray et al. | 342/451 |
| 2014/0133312 | A1* | 5/2014 | Nakadai | H04L 45/12 370/238 |

OTHER PUBLICATIONS

Gui et al., "Routing Strategies in Multihop Cooperative Networks", "IEEE Transactions on Wireless Communications", Feb. 2009, pp. 843-855, vol. 8, No. 2, Publisher: IEEE.

Han et al., "Smart Deployment/Movement of Unmanned Air Vehicle to Improve Connectivity in MANET", "WCNC 2006 Proceedings", 2006, pp. 252-257, Publisher: IEEE Communications Society.

Huang et al., "A Survey of Opportunistic Networks", "22nd International Conference on Advanced Information Networking and Applications", Mar. 2008, pp. 1672-1677.

International Searching Authority, "International Search Report and Written Opinion", from Foreign Counterpart of U.S. Application, Jan. 20, 2012, pp. 1-10, Published in: WO.

* cited by examiner

TELECOMMUNICATIONS NETWORK ROUTING

CROSS-REFERENCE TO RELATED APPLICATIONS

This application claims priority to International Patent Application No. PCT/GB2011/051828 filed on Sep. 27, 2011, which claims priority to Great Britain Patent Application No. 1016306.1 filed on Sep. 28, 2010.

FIELD OF THE INVENTION

The invention relates to the field of telecommunications network routing, and in particular the field of opportunistic networks. For example, embodiments of the invention relate to telecommunications networks in geographic areas in which there is little or no permanent wired network infrastructure.

BACKGROUND OF THE INVENTION

The performance of civil and military operations, such as responses to emergencies and operations in remote or non-friendly territory, can be seriously compromised if communication links are poor. Unfortunately, communication links often are poor in such territories, either as a result of natural or military disruption of pre-existing permanent links, or as a result of there being no or few such permanent links in the first place.

A great deal of research has been done in recent years into the performance of opportunistic telecommunications networks, which do not rely on the existence of pre-existing fixed links. Many such networks, for example networks established on an ad hoc basis between mobile phones or between road vehicles, require a high density of devices able to participate in the network; clearly, that will often not be available in post-disaster, conflict or similar areas. Furthermore, many operations have requirements beyond mere connectivity—for example, security requirements may necessitate restricting data to trusted network devices, and in many cases to trusted network devices specifically rated to handle the sensitive information—which can reduce still further the number of available nodes in a network.

Most work in this area has concentrated on devising and investigating different forms of routing. Some work has also been done considering the best choice of bearer for links. One approach adopted in the area of tactical (military) communications is provision of dedicated communications unmanned aerial vehicles (UAVs). However, UAVs are very expensive. Another approach is to mount network communications devices on vehicles that have a primary function that is not communications, for example, transport aircraft. By extending the range of possible platforms that can be employed, the number of available platforms can be increased significantly; however, typically the non-dedicated vehicles will be available only intermittently, according to the requirements of their primary function. Networks incorporating such "non-communication assets" are referred to as "opportunistic networks", often taken to be a sub-class of Disruption/Delay Tolerant Networks. Such networks have been studied with a view to optimising the routing of communications data over their links, in view of their intermittent nature.

In "Routing Strategies in Multihop Cooperative Networks", IEEE Transactions on Wireless Communications, Vol. 8, No. 2, February 2009, Gui et al present a study of outage performance, taking into account the fading characteristics and broadcast nature of wireless channels, for three different routing strategies: optimal routing, in which the source-to-destination path with the largest minimum signal-to-noise ratio (SNR) is chosen; ad-hoc routing, in which the hop with the highest SNR is chosen at each node from available next hops; and N-hop routing, in which the path with the largest minimum SNR over groups of N hops is chosen. Optimal routing is found to give the best outage performance, but at the expense of greatly increasing complexity of calculation for routing over more and more hops. Ad-hoc routing suffers from greater outage, but the complexity of calculation is the same regardless of the number of hops. N-hop routing is a compromise that can provide a good trade-off between outage performance and complexity of calculation.

Despite these various efforts, there remain environments in which there are unlikely to be sufficient dedicated communications nodes in a deployable network to provide communication links of the desired quality. Of the approaches discussed above, the use of communication nodes on non-communications assets to work on an opportunistic basis is a more cost-effective approach than using dedicated communications UAVs, but such non-communications assets provide only "nodes of opportunity", which will usually be far from optimal. Prior-art attention has generally been focused on mobile ad hoc network (MANET) issues.

The present invention seeks to mitigate the above-mentioned problems.

SUMMARY OF THE INVENTION

The present invention provides, in a first aspect, a network controller for controlling a telecommunications network comprising a plurality of vehicles each including a telecommunications device, the network controller comprising:

a network configuration database, containing data representing the configuration of the network;

an assets database, containing for each vehicle (i) data representing planned movements of the vehicle in a geographic area, the vehicle having a planned route from a first location to a second location, and (ii) data representing parameters for acceptable variation in said route;

an information exchange requirement (IER) database, containing data representing expected future network loading;

an optimisation engine configured to calculate from the data stored in the network configuration database, assets database and IER database, a set of routes for the vehicles, subject to the parameters for acceptable variation, that optimises the availability of the telecommunications network in the geographic area; and a tasking-order dispatcher, configured to generate tasking orders for transmitting to the vehicles from the set of routes calculated by the optimisation engine.

Thus, the optimisation engine aims to vary the tasking orders of the vehicles within predefined limits, to provide optimal (or near optimal) telecommunication network coverage and throughput based on the operational need. The invention makes use of an optimisation engine in the form of an optimisation algorithm or behaviour engine that takes into account assets which can potentially provide communications. It will be understood by those skilled in the art that the terms "optimisation", "optimal" and the like do not necessarily refer to globally most-preferable scenarios, but rather refer to scenarios that are determined to be optimal by operation of an optimisation procedure. As is well known, such optimisation procedures can in practice identify as optimal scenarios that are locally but not globally optimal.

The optimisation engine may utilise any appropriate optimisation algorithm, for example evolutionary algorithms, Tabu, or simulated annealing.

The network configuration database may include details of network routing algorithm(s) used in the network. The network configuration database may include details of the locations of fixed nodes in the network. The network configuration database may include details of the locations of the pluralities of vehicles at one or more moments in time. The network configuration database may include details of network characteristics of the telecommunications devices included in the vehicles, for example the bandwidth and/or range of the devices. It may also store achievable topologies, in view of the acceptable variations in the routes of the vehicles.

It may be that the acceptable variation in the route is constrained by an operational limitation of the vehicle, for example one or more limitation selected from the group consisting: of available fuel, available energy, available processing power, available memory, operational constraints, performance envelope, timescales, and type of communications capability provided.

The vehicles that include a telecommunications device may be aircraft, land vehicles, sea vehicles, space vehicles, or a combination of two or more of those types of vehicles. In the case of an aircraft, the vehicle may be manned or unmanned.

The assets database may include for example predicted geographic locations of the vehicles, scheduled departure and arrival times, and/or predicted velocities. The assets database may include for example acceptable variations in geographic locations of the vehicles, scheduled departure and arrival times, and/or predicted velocities.

The expected network loading data contained in the IER database may include data relating to the expected network loading requirements of a mobile operations team.

The tasking-order dispatcher may be configured to dispatch the tasking orders to the vehicles electronically, for example over a telecommunications link.

The present invention provides, in a second aspect, a method of controlling a telecommunications network, the method comprising:
(1) receiving data concerning the configuration of the telecommunications network;
(2) receiving data concerning expected future telecommunications loads in a geographic area;
(3) receiving data concerning planned movements of a plurality of vehicles in the geographic area, each vehicle including a telecommunications device and having a planned route from a first location to a second location, and data concerning acceptable variation in said route; and
(4) optimising the availability of telecommunication connectivity in the geographic area by altering the planned route of at least one of the vehicles within the acceptable variation of that route.

The method is carried out using electronic hardware, for example the apparatus described above in relation to the first aspect of the invention. The data received concerning future telecommunications loads may include data concerning present telecommunications loads. The data may include network statistics, for example link loading, error ratio, and/or delay.

The optimisation of the availability of telecommunications activity may comprise the steps of (a) calculating a set of routes for the vehicles that optimises the availability of telecommunication connectivity in the geographic area, and (b) instructing the vehicles to follow those routes.

The data received concerning future telecommunications loads may include data concerning future telecommunications needs of vehicles or individuals operating in the geographic area.

The method may include the step of calculating expected network loads from the data concerning the future telecommunications needs and the data concerning present telecommunications loads.

The method may include the step of updating one or more databases containing expected information exchange requirements and/or node locations, in view of the data received concerning future telecommunications loads.

It may be that the optimisation of the availability of telecommunication connectivity in the geographic area is achieved by optimisation of the network topology and node locations in view of all relevant constraints. Thus, the capabilities of the various assets may be considered, along with the loading, to calculate the best layout to achieve the anticipated IERs. That includes predicting link behaviour, so terrain and weather conditions may be relevant; thus, the data concerning future telecommunications loads may include meteorological and/or geographic data.

The planned route of at least one of the vehicles may be altered by dispatching updated tasking orders that implement the altered route.

The method may include repeating steps (1) to (3) of the method. The method may include the step of comparing the benefit of implementing the route alteration with the cost of changing the orders of the vehicle. Thus, the method may take into account the "cost" of changing the orders and so will not necessarily recommend change.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
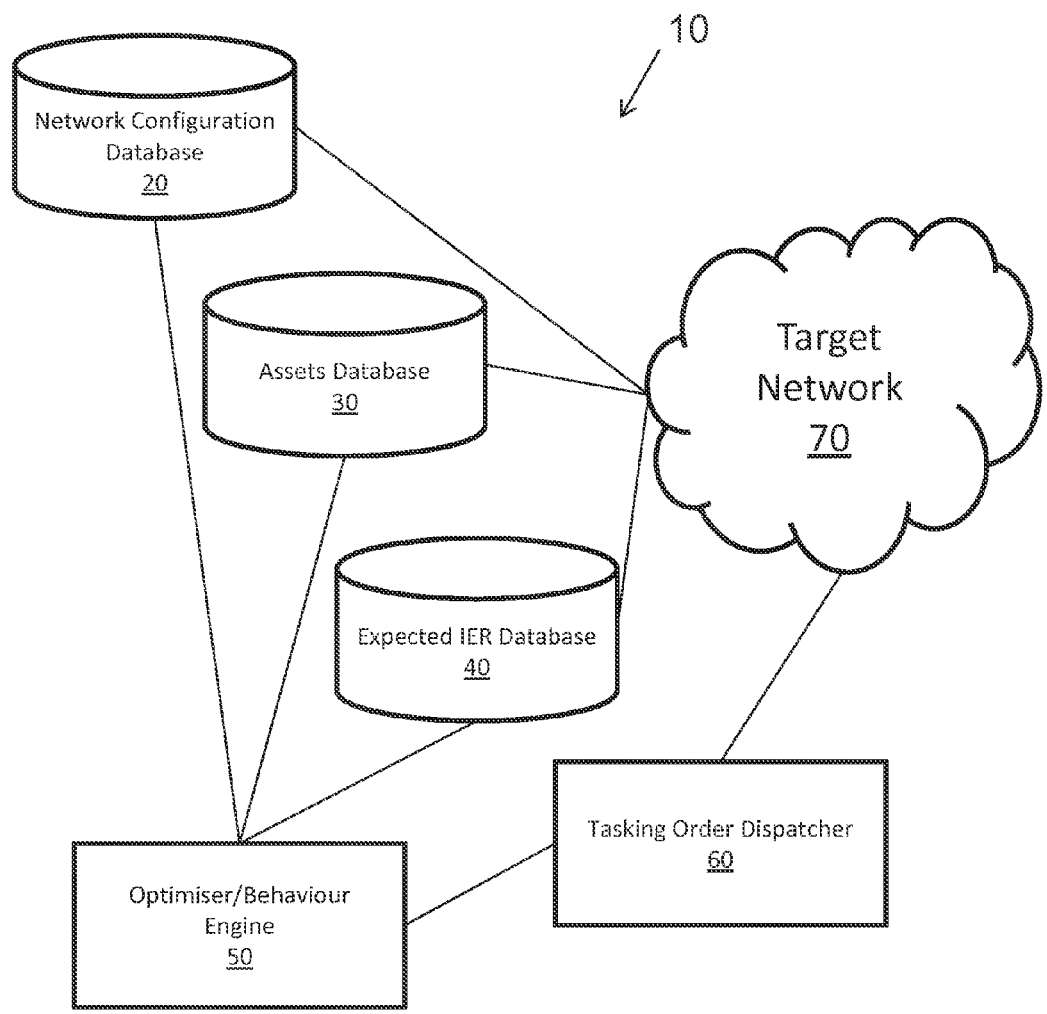
FIG. 1 shows network apparatus employed in a first example embodiment of the invention.

In a first example embodiment of the invention, network apparatus 10 includes (FIG. 1) a network configuration database 20, an assets database 30, an expected IER database 40, an optimiser/behaviour engine 50 and a tasking order dispatcher 60. The apparatus 10 is connected to a target network 70, which includes mobile telecommunications assets, by which is meant devices that are able to act as nodes in the target network 70. The target network 70 includes telecommunications assets that are carried by an operations team, who are to travel through a geographical area having poor telecommunications network coverage. The target network 70 also includes telecommunications assets mounted on vehicles that are tasked with orders not related to telecommunications needs (including freight transport vehicles tasked with orders relating to the movement of freight across the geographic area), as well as telecommunications assets mounted on UAVs and other platforms dedicated to carrying the assets.

The network configuration database 20 is a standard database that stores the configuration of the network 70.

The assets database 30 is a database that stores tasking orders for mobile assets that form part of the network 70. The assets database 30 also stores parameters defining the extent to which the tasking orders for each mobile asset may be varied.

The expected IER database 40 stores details of expected future telecommunications need, and hence of the network loading expected in the future.

The optimiser/behaviour engine 50 is configured to determine the optimal route for each mobile asset, having regard to the network configuration stored in the network configuration database 20, the tasking orders and related parameters stored in the assets database 30, and the details of expected future telecommunications need stored in the expected IER database 40. In the present example, the well-known optimisation technique of simulated annealing is used to calculate the optimal routes. In alternative embodiments, other optimisation techniques are used, e.g. evolutionary algorithms or Tabu search. It is a feature of these techniques that they allow the inclusion of constraints and discontinuous penalty functions. In the context of behavioural engines, they are available commercially (e.g. Erudine) and can run on very modest hardware, and have sub-second reaction times and thousands of "rules" equivalent, as well as highly effective "tacit" knowledge capture techniques.

The tasking order dispatcher 60 is configured to dispatch tasking orders to the mobile assets. The tasking orders, when followed by the mobile assets, implement the optimal routes calculated by the behaviour engine 50.

Figure 2:
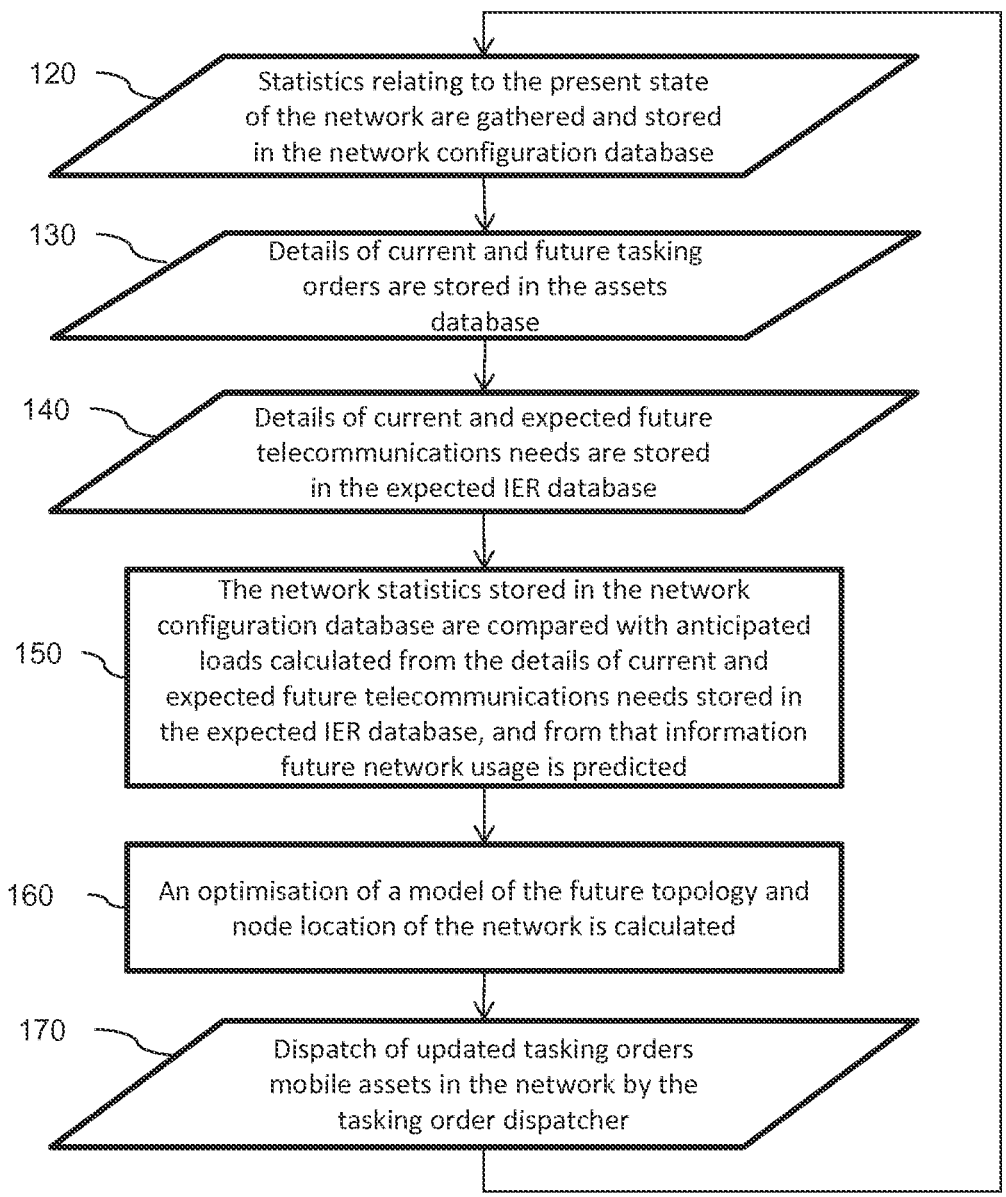
FIG. 2 is a flow chart showing the steps of a method of operating the apparatus of FIG. 1 according to the first embodiment of the invention.

Operation of the apparatus 10 is as follows (FIG. 2):

Step 120: statistics relating to the present state of the network 70 (e.g. link loading, error ratio, delay etc.) are gathered and stored in the network configuration database 20.

Step 130: details of current and future tasking orders (or changes thereto) are stored in the assets database 30.

Step 140: details of current and expected future telecommunications needs, including the expected needs of the operations team (or changes thereto) are stored in the expected IER database 40.

Step 150: the network statistics stored in the network configuration database 20 are compared with anticipated loads calculated from the details of current and expected future telecommunications needs stored in the expected IER database 40, and from that information future network usage is predicted. Thus, the expected telecommunications needs, and hence the predicted loads on different parts of the network 70, are sanity-checked against the existing loads, and consequently the predicted load is adapted. The network configuration database 20, assets database 30, and expected IER database 40 are updated in view of that predicted usage, including the expected IER and node locations.

Step 160: an optimisation of a model of the future topology and node locations of the network 70 is calculated, taking into account all known constraints, including the tasking orders and allowable variations therein for the various assets and the predicted loading of the network 70. The optimisation also takes into account terrain and weather conditions, which can affect the behaviour of links in the network 70. The optimisation aims to calculate the best layout to achieve the predicted IERs.

Step 170: dispatch of updated tasking orders to mobile assets in the network 70 by the tasking order dispatcher 60, so that the desired topology is achieved.

Steps 120 to 170 are repeated continuously. However, note that the system will take account of the "cost" of changing the tasking orders, and so will not necessarily recommend change. A good trade-off between the cost of change and the increase in value of the new approach will be assessed in the optimiser 50 (it can for example be treated as another constraint in the optimiser).

A hypothetical mission scenario (FIG. 3) will now be described, as an example to illustrate operation of the apparatus and method.

A network is deployed in a region. However, there are whole areas where communication is impossible. Three communication UAVs are the only dedicated assets available for deployment to cover the affected region. Due to maintenance and handover between UAVs, typically only one UAV, in FIG. 3 the aircraft 250, is in the air at a given time. Consequently, groups that go out into the region frequently do not get reliable communications and therefore arrive in the wrong place at the wrong time.

Figure 3:
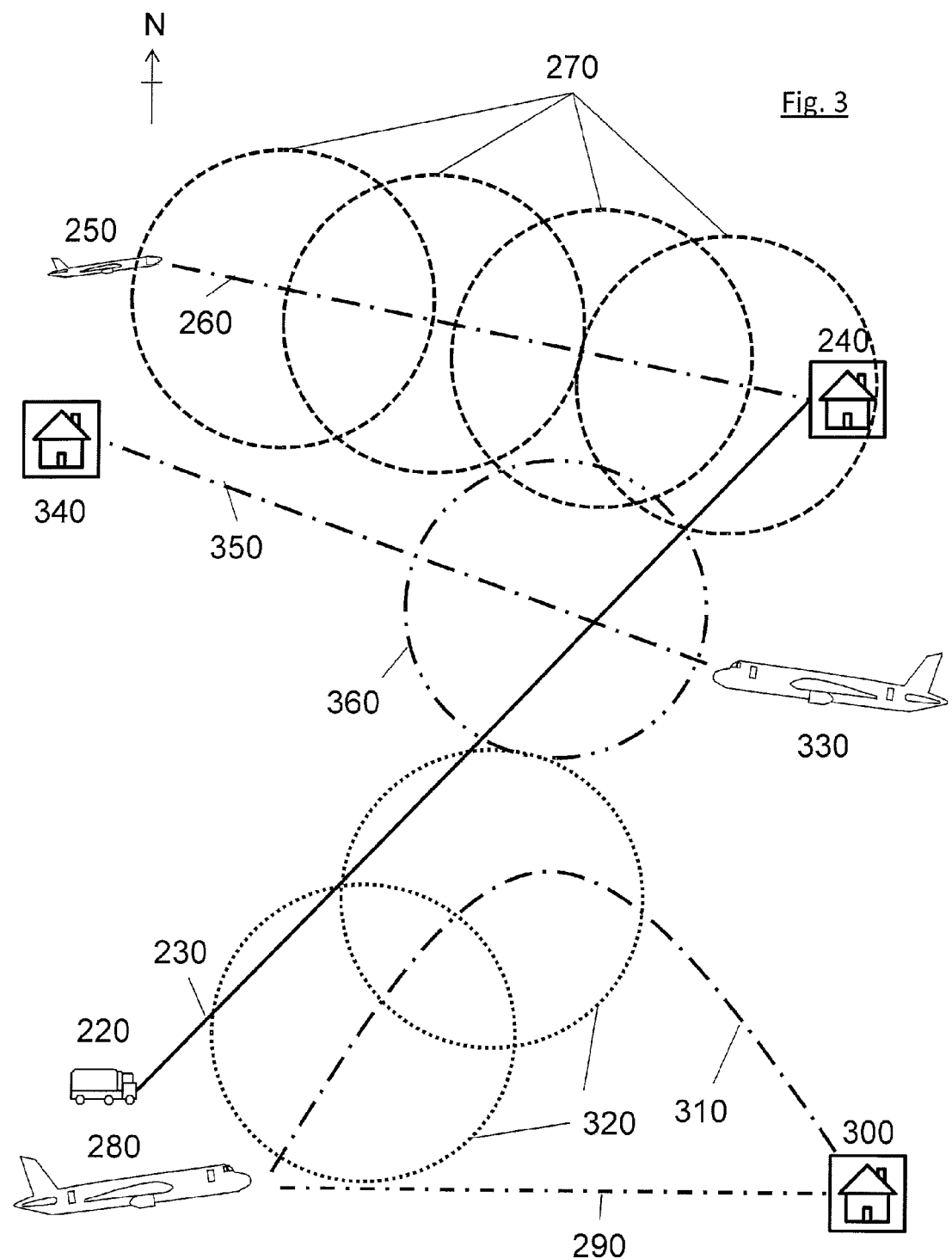
FIG. 3 is a schematic illustration of a mission scenario in which the apparatus of FIG. 1 and the method of FIG. 2 are employed.

In this example, an operations team 220 is travelling NE from the SW corner of the region shown in FIG. 3, in a straight line to a base 240. The UAV 250 is already tasked with operations in the NW region, and, although it heads in an ESE direction along a route 260 towards the same base 240, the radio coverage 270 of the UAV 250 only overlaps with the route of the team 220 in its latter stages.

However, the coordinator of the operation fits communications appliqués to a dozen aerial vehicles that are in use fairly frequently in the area and have central automated coordination of those assets. Using automated optimisation of the network topology, as described above, the flight plans of the upgraded aerial vehicles are adjusted so that at any one time there is a network that can cope with the communications load. The vehicles are used to fill gaps in the network when no other asset can cover the region. In this case, frequently two vehicles 280, 330 are used simultaneously, as they do not have to cover for each other, as other aerial vehicles will often be able to take over before the vehicle must refuel. The net result is that continuous coverage can be maintained most of the time on the ground. This allows full situational awareness, and an ability to rapidly react to changes in circumstances with better command and control.

In this example, a transport aircraft 280 is tasked to fly E from the SW region to a base 300 in the SE region, along a direct flight path 290. However, there is considerable leeway in the timing of the flight, and plenty of fuel available. The optimisation engine 50 calculates an alternative route 310 for the aircraft 280, wherein the aircraft 280 first heads NE, tracking the team 220, before veering SE to complete its own mission. New tasking orders are transmitted to the aircraft 280 by the tasking order dispatcher 60, instructing its pilot to take that revised route. The flight path is such that the radio coverage 320 of the communications appliqué fitted to the aircraft 280 enables the team 220 to remain in contact with the network 70 for most of the first half of its route 230.

A second aircraft 330 is tasked to fly in a straight line 350 WNW from the E region, towards a third base 340. The optimisation engine 50 calculates that, by delaying the take-off time of the aircraft 330, telecommunications coverage can be provided to the team 220. New tasking orders are transmitted to the aircraft 330 by the tasking order dispatcher 60, its pilot alters his route accordingly, and the radio coverage 360 provided by the aircraft 330 substantially fills the gap in network connectivity that the team 220 would otherwise suffer on its route 230 between the coverage of the aircraft 280 and the UAV 250.

Example embodiments of the invention thus employ a novel technique for dealing with the tasking of the movement of communications nodes, in particular communications nodes on non-communications assets. The technique incorporates the control of movement (within operational constraints) of all relevant assets. By utilising this approach, the maximum effect can be squeezed from available assets. Opportunistic and DTN networks are known to be a difficult area; this approach is looking at the problem from a more holistic viewpoint.

The system can efficiently incorporate whatever assets are available. By taking this approach, the cost of ownership for airborne nodes may be reduced by the efficient piggy-backing of communications nodes on non-communications assets. In general, by adding some flexibility into a system, by being able to alter the planning within constraints, large gains can be expected in the ideal case. This will allow a slow introduction of airborne communications nodes which will not require an immediate large outlay for the advanced UAVs (which is unlikely to be accepted in the present economic climate). Instead, it will reuse existing platforms where possible, thereby lowering the cost of entry, although gradually it could lead to a fully UAV-based system over time.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A network controller for controlling a telecommunications network comprising a plurality of vehicles each including a telecommunications device, the network controller comprising:
   a network configuration database, containing data representing a configuration of the network;
   an assets database, containing for each of the plurality of vehicles (i) data representing planned movements of the vehicle in a geographic area, the vehicle having a planned route from a first location to a second location, and (ii) data representing parameters for acceptable variation in the planned route, wherein, for the vehicle, the parameters for acceptable variation in the planned route comprise an operational limitation for the vehicle, wherein the parameters for acceptable variation constrain an amount of variation in the planned route;
   an information exchange requirement (IER) database, containing data representing expected future network loading;
   an optimisation engine configured to calculate from the data stored in the network configuration database, assets database and IER database, a set of routes for the plurality of vehicles that optimises, subject to the parameters for acceptable variation, an availability of the telecommunications network in the geographic area; and
   a tasking-order dispatcher, configured to generate tasking orders for transmitting to the plurality of vehicles from the set of routes calculated by the optimisation engine.

2. The network controller according to claim 1, wherein the network configuration database includes details of a network routing algorithm used in the network.

3. The network controller according to claim 1, wherein the network configuration database includes details of network characteristics of the telecommunications devices included in the plurality of vehicles.

4. The network controller according to claim 1, wherein the assets database includes at least one of predicted geographic locations of the plurality of vehicles, scheduled departure and arrival times, and predicted velocities.

5. The network controller according to claim 1, wherein the assets database includes at least one of acceptable variations in geographic locations of the plurality of vehicles, scheduled departure and arrival times, and predicted velocities.

6. The network controller according to claim 1, wherein the expected network loading data contained in the IER database includes data relating to the expected network loading requirements of a mobile operations team.

7. The network controller according to claim 1, wherein the operational limitation of the vehicle comprises one or more of: available fuel, available energy, available processing power, available memory, operational constraints, performance envelope, timescales, and type of communications capability provided.

8. A method of controlling a telecommunications network, the method comprising:
   (1) receiving data concerning the configuration of the telecommunications network;
   (2) receiving data concerning expected future telecommunications loads in a geographic area;
   (3) receiving data concerning planned movements of a plurality of vehicles in the geographic area, each of the plurality of vehicles including a telecommunications device and having a planned route from a first location to a second location, and data concerning acceptable variation in the planned route, wherein, for a given vehicle of the plurality of vehicles, the data concerning acceptable variation in the planned route comprise an operational limitation for the given vehicle, wherein the parameters for acceptable variation constrain an amount of variation in the planned route; and
   (4) optimizing availability of telecommunication connectivity in the geographic area by altering the planned route of at least one of the plurality of vehicles within the acceptable variation of that route.

9. The method according to claim 8, in which the data concerning future telecommunications loads includes data concerning present telecommunications loads.

10. The method according to claim 9, in which the data concerning future telecommunications loads includes network statistics, wherein the network statistics comprise at least one of link loading, error ratio, and delay.

11. The method according to claim 8, in which the data concerning future telecommunications loads includes data concerning future telecommunications needs of vehicles or individuals operating in the geographic area.

12. The method according to claim 9, further comprising:
   calculating expected network loads from the data concerning future telecommunications loads and the data concerning present telecommunications loads.

13. The method according to claim 8, further comprising:
   updating one or more databases containing at least one of expected information exchange requirements and node locations in view of the data concerning future telecommunications loads.

14. The method according to claim 8, wherein the optimisation of the availability of telecommunication connectivity in the geographic area is achieved by optimisation of a network topology and node locations in view of all relevant constraints.

15. The method according to claim 8, wherein the planned route of at least one of the plurality of vehicles is altered by dispatching updated tasking orders that implement the altered route.

16. The method according to claim 8, further comprising: repeating steps (1) to (3).

17. The method according to claim 8, further comprising:
   comparing benefits of implementing the route alteration with costs of changing tasking orders of the plurality of vehicles.

* * * * *